(12) United States Patent
Shirley

(10) Patent No.: US 6,402,651 B1
(45) Date of Patent: Jun. 11, 2002

(54) EMERGENCY DRIVE BELT

(76) Inventor: Chester Lee Shirley, 8790 Portland Rd., Salem, OR (US) 97305

( * ) Notice: Subject to any disclaimer, the term of this patent is extended or adjusted under 35 U.S.C. 154(b) by 0 days.

(21) Appl. No.: 09/395,863

(22) Filed: Sep. 14, 1999

(51) Int. Cl.⁷ .................................................. F16G 7/00
(52) U.S. Cl. ...................................................... 474/253
(58) Field of Search ................................ 474/253, 254, 474/255, 256, 257, 258, 259; 24/68 CD, 909, 164, 265 CD

(56) References Cited

U.S. PATENT DOCUMENTS

| | | | | |
|---|---|---|---|---|
| 941,136 A | * | 11/1909 | Dubois | 24/191 |
| 2,591,648 A | * | 4/1952 | White et al. | 24/191 |
| 3,162,914 A | * | 12/1964 | Ireland | 24/170 |
| 4,254,666 A | * | 3/1981 | Seredick | 474/253 |
| 4,445,877 A | * | 5/1984 | Love et al. | 474/255 |

* cited by examiner

*Primary Examiner*—David A. Bucci
*Assistant Examiner*—Vicky A. Johnson
(74) *Attorney, Agent, or Firm*—Robert L. Harrington

(57) ABSTRACT

An emergency belt for use on a motor drive unit that does not require tools for installation. A buckle on one end of the belt has an opening through which the opposite end of the belt is inserted. The buckle has a latching mechanism that engage notches formed on the under side of the belt. The latching mechanism allows tongue end of the belt to be inserted through the buckle in one direction yet prevents movement in the opposite direction. The belt is tightened by pulling the tongue end through the buckle.

9 Claims, 3 Drawing Sheets

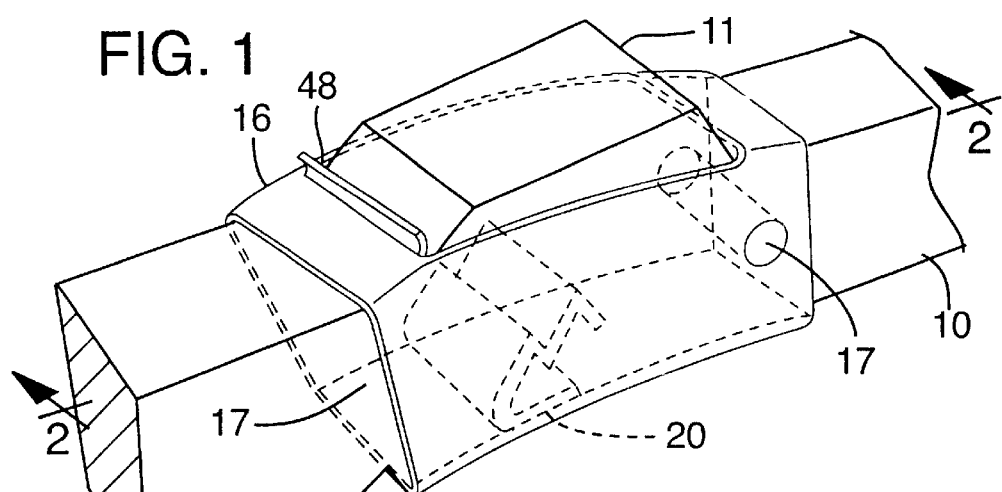
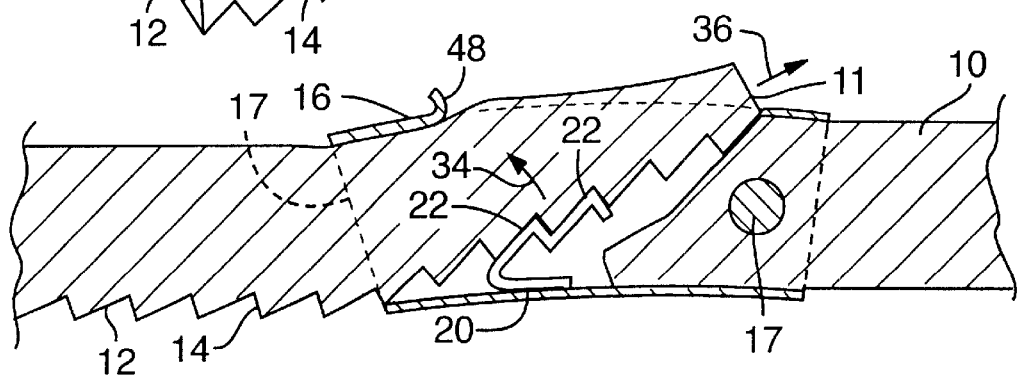
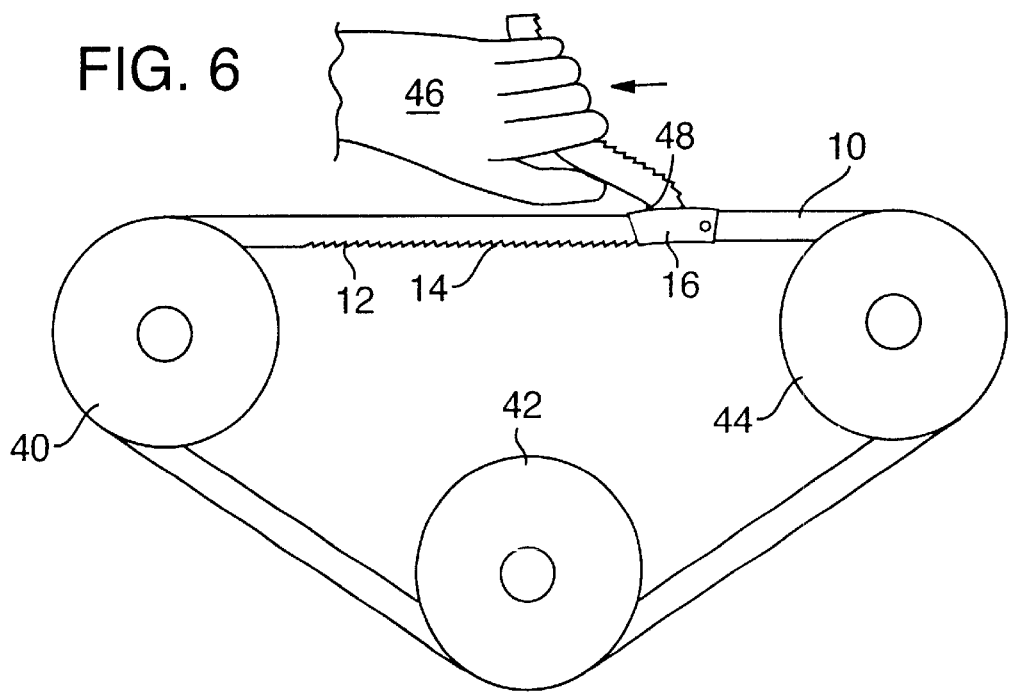

EMERGENCY DRIVE BELT

FIELD OF THE INVENTION

The invention relate to drive belts, e.g., used on vehicle engines used to drive, e.g., a fan for cooling the engine, water pump, fuel pump and the like, and more particularly it relates to emergency replacement belts to be mounted on the vehicle engine while in the field (at a road side) in the event of a fan belt breakage.

BACKGROUND OF THE INVENTION

This invention is applicable to all manner of vehicles but the greatest need is considered to be that of long haul trucks. Trucks are expected to have a lifetime measured in hundreds of thousands of miles. A truck engine typically incorporates a drive belt of belts to drive critical components, e.g., a fan and/or a water pump, etc. In the event that the belt breaks, the truck quickly becomes un-drivable as the engine rapidly heats to a point of eminent destruction. The driver has no choice but to stop the truck and arrange for repairs of risk a major engine failure.

A truck loaded with needed products and delayed by something so simple as a broken fan belt can result in huge added costs. Carrying an extra fan belt or belts in the truck would appear to be an answer to this problem. However, the belts must be tight and they typically are mounted on sheave-type pulleys that require tightening after the belt is mounted on the pulleys. This is accomplished by the pulleys being adjustable. Thus, the pulleys have to be loosened, the belt mounted on the pulleys and then the pulleys have to be tightened. Tools and knowhow are required (in addition to having the correct fan belt size along) and the procedure is undesirably time consuming.

BRIEF DESCRIPTION OF THE PRESENT INVENTION

The present invention is directed to a temporary length adjustable fan belt that can be mounted to the pulleys without adjusting the pulleys, substantially without tools and in minutes of time. The belt has a male/female coupling at its respective ends and is not unlike any number of different types of clothing belts worn, e.g., by men to secure their trousers at the waist. One end is the female end (the buckle end) of the coupling that receives the male end (the tongue end). The tongue end is extended through the buckle and pulled taut (in a manner similar to how a waist belt is cinched up). A fastening mechanism having a mated part on each of the tongue and buckle is engaged at the taut condition and the belt is thereby secured onto the pulleys, and the truck (vehicle) can be driven for a period of time to accommodate a regular stop having repair facilities.

A preferred coupling is a one-way coupling where the tongue end will slide through the buckle end in the direction of tightening the belt but cannot be pulled backward to loosen the belt. The buckle contains flexible protrusions and the tongue is formed with ridges or notches that slide over the protrusions, the protrusions being angled toward the tongue end and flex out of the way as the tongue is pulled through the buckle. The protrusions engage the ridges and prevent a reverse pull of the tongue through the buckle end. Release of the protrusions to permit loosening requires a tool that can be fit between the protrusions and the tongue to hold the tongue away from the ridges.

The belt can be oversized in length so as to insure a fit around the pulleys for any size of broken belt and the excess simply cut off. Also, a plurality of shorter belts can be carried and two or more belts coupled together as needed to fit around the pulleys.

The invention will be more fully understood from the following detailed description having reference to the accompanying drawings.

DESCRIPTION OF THE DRAWINGS

FIG. 1 is a partial view of a v-belt and a buckle in accordance with the present invention;

FIG. 2 is a sectional view of the v-belt of FIG. 1 as indicated by view lines 2—2 of FIG. 1;

FIG. 6 is a schematic illustration of the v-belt of the invention being assembled onto the pulleys of a vehicle.

DESCRIPTION OF THE PREFERRED EMBODIMENT

Figure 3:
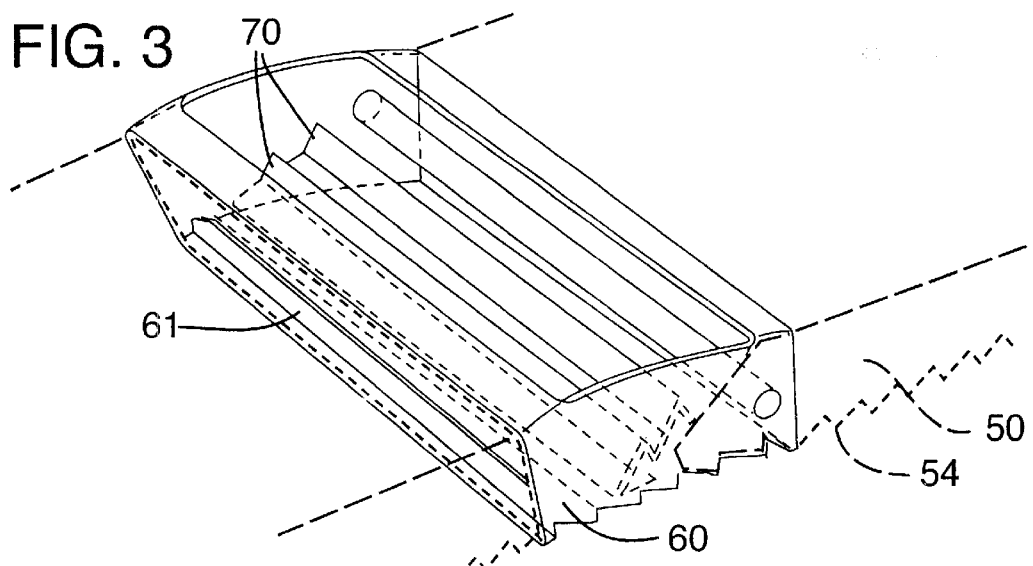
FIG. 3 is a view of a buckle used for a poly v-belt which is shown in dash lines.

FIGS. 1 and 2 illustrate a v-belt 10 that is arranged to be installed without tools or other devices. It is intended as an emergency belt for use when a drive belt, such as a belt that drive accessory devices on a motor fails. Typically such belts are used on motors for cars, trucks, buses and the like. The motors have accessory items that are driven from the motor by a v-belt. Such items are alternators (generators) power steering pumps, air conditioning compressors, and the like. When a v-belt fails while the vehicle is on the road, service is likely to be miles away. Sending for service is costly and often results in a long wait.

The v-belt 10 of FIGS. 1 and 2 is arranged to replace a conventional v-belt on a motor vehicle or other typical power unit.

The v-belt 10 has a similar cross section to that of the v-belt that it is intended to replace. The v-belt 10 does however have some modifications that enable installing the v-belt 10 without tools. Notches 14 (sometimes referred to as ridges), are formed on the bottom or inner side 12 of the v-belt 10. The notches 14 extend substantially along the length of the belt 10 as needed to insure that the belt can be properly tightened.

A buckle or bracket 16 is securely to one end of the belt 10, e.g., by a pin 17. The buckle 16 has an internal shape that conforms to the profile of the belt 10. The opposite end 11 (tongue end) of the belt 10 is insertable through an entry portion 19 (opening) of the belt 16. A latching device 20 is mounted in the buckle 16 and is provided to secure the tongue end of the belt 10 in the buckle 16. The latching device 20 is biased to pivot in the direction indicated by arrow 34. The latching device 20 has a stepped configuration 22 (protrusions) that is shaped to fit in the notches 14 of the belt 10 and only permit the belt 10 to be moved in one direction through the buckle 16. The direction that the end of the belt 10 may be moved through the buckle 16 is indicated by arrow 36. It will be appreciated that the end of the belt 10 may be moved in the direction opposite arrow 36 by forcibly moving the latching device 20 in a direction opposite that of arrow 34. Moving the latching device 20 in this direction will move the stepped configuration 22 of the latching device out of the notch or notches 14 with which it was engaged. The tongue end 11 of the belt 10 then may be moved through the buckle 16 in the direction opposite that of arrow 36.

Figure 7:
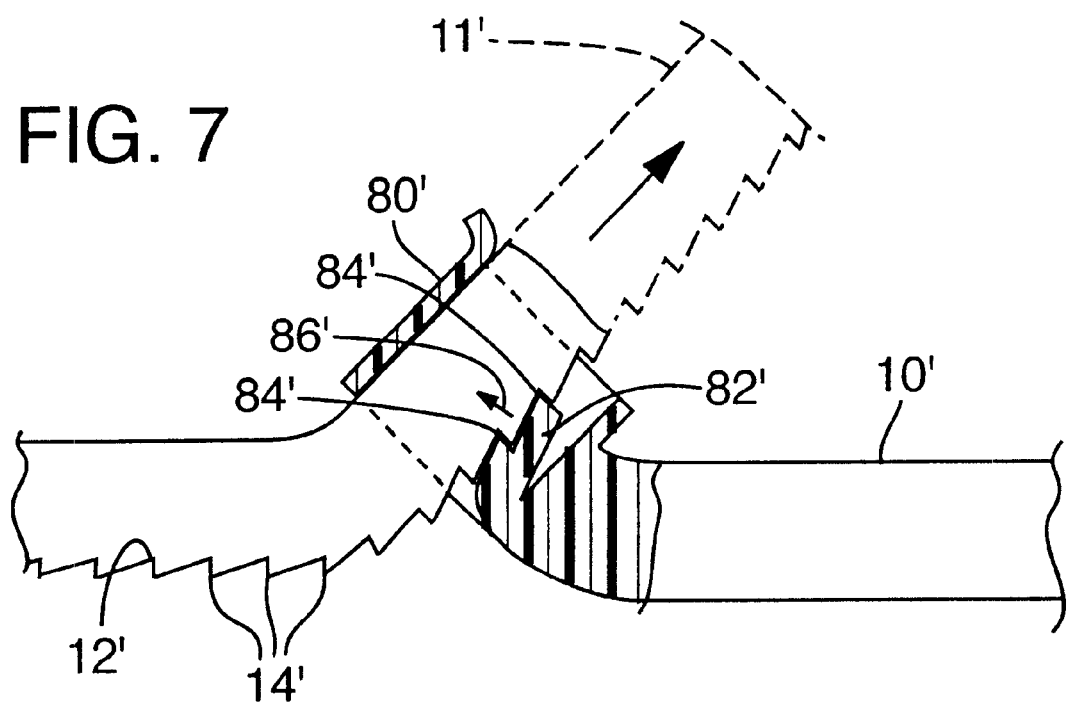
FIG. 7 is a view of another embodiment of a v-belt and buckle in accordance with the present invention.

FIG. 7 illustrates another embodiment of the v-belt 10' that is readily mountable to a vehicle without tools. V-belt 10' of FIG. 7 has notches 14' formed on the underside 12'. A buckle 80' is integrally formed on one end of the belt 10' and is arranged such that the tail end 11' may be inserted through the buckle 80' and secured by a latching mechanism 82'. In this embodiment the latching mechanism 82' has two teeth 84' that are arranged to engage the notches 14' on the underside of the belt 10'. The latching mechanism 82' is biased to move in the direction indicated by arrow 86' and thus as the tongue end 11' of the belt is inserted through the buckle 80', the teeth 84' will be forcibly biased to move into the notches 14' on the underside of the belt.

Figure 4:
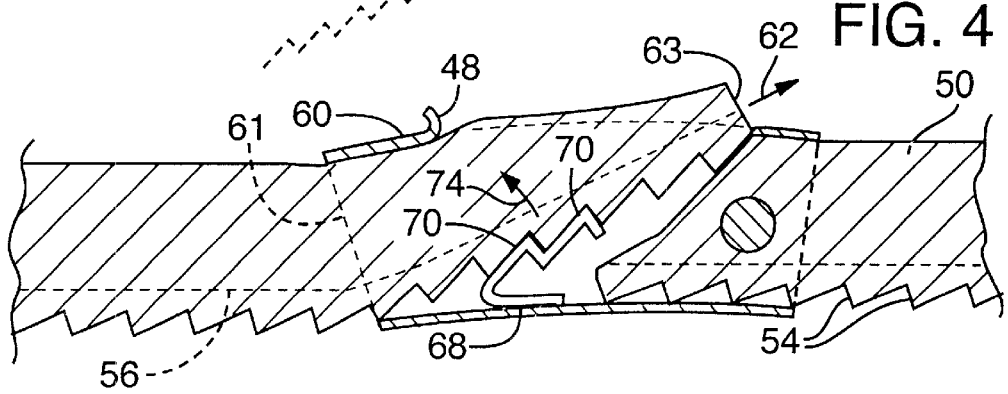
FIG. 4 is a sectional view of the poly v-belt and buckle of FIG. 3.
Figure 5:
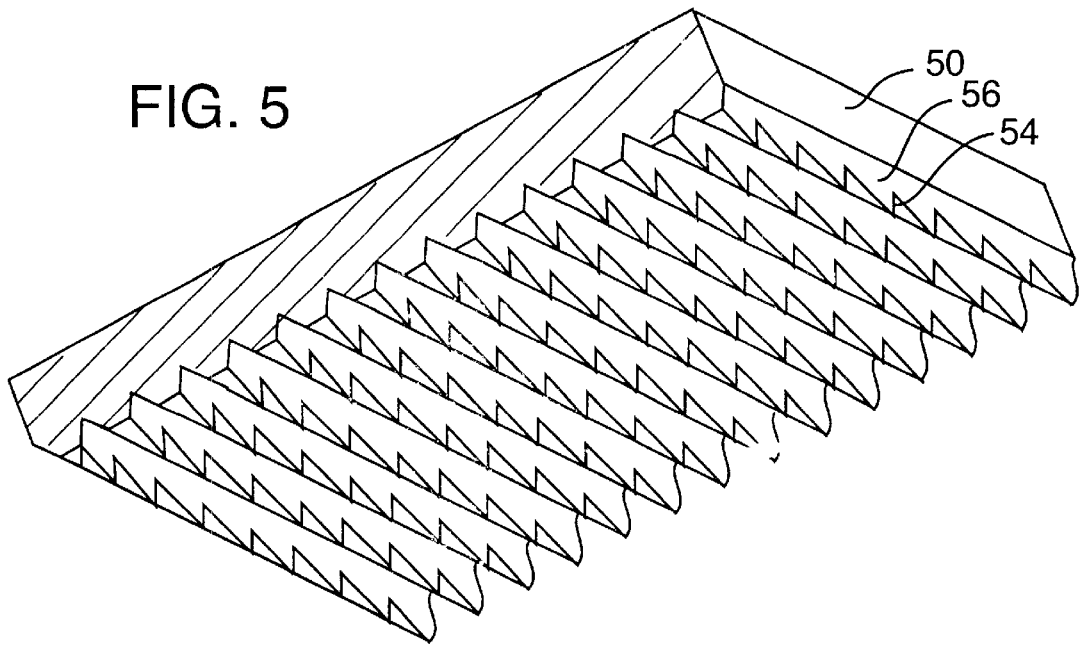
FIG. 5 is a bottom view of the poly v-belt of FIG. 3.

FIGS. 3, 4 and 5 illustrates another embodiment of the present invention. In this embodiment, the belt is a poly v-belt that is commonly used on modern vehicles and the like. The poly v-belt 50 is also installable on a drive unit without tools. The belt 50 has notches or ridges 54 formed on the crest of each of the v-sections (best seen in FIG. 5) that are on the underside 56 of the belt 50. The notches 54 are of a modified buttress form similar to the notches 14 on the belt 10. A buckle (bracket) 60 is integrally formed on one end of the belt 50 and has an entry 61 for inserting the opposite end 63 (tongue end) of the belt 50.

A latching device 68 is integrally formed with the buckle 60. The device 68 is biased to pivot in the direction indicated by arrow 74. An end 70 of the device 68 is configured to fit in and engage the notches 54 on the underside 56 of the belt 50. The configuration of the notches 54 and the end 70 permit the end of the belt 50 to be moved through the buckle 60 in the direction indicated by arrow 62. The configured end 70 in engagement with the notches 54 will however prevent movement of the end 63 of the belt through the buckle 60 in the direction opposite that indicated by arrow 62. In order to move the end 63 in the direction opposite arrow 62, the configured end 70 must be manually disengaged from the notches 54 by moving the end 70 in the direction opposite that of arrow 74.

Either of the belts described and illustrated are readily installed without tools. Upon failure of a belt, a consumer simply mounts the belt (10 or 50 according to needs) around the sheaves (pulleys) of the drive component. For example, belt end 11 of the belt 10 is inserted through the buckle 16. As the end 11 of the belt 10 is pulled through the bracket, the notches 14 engage the latching device 20 to prevent the belt from moving through the buckle 16 in the direction opposite that indicated by arrow 36. The end 11 of the belt 10 is pulled through the buckle 16 until the belt 10 is sufficiently tightly mounted on the sheaves of the drive unit.

The end 11 of the belt 10 that extends beyond the buckle 16 is then simply cut off near the buckle 16.

Similarly, the belt 50 is installed on the sheaves of a drive unit. The end 63 of the belt 50 is inserted through the buckle 60. The end 63 of the belt 50 is pulled through the buckle 60 until the belt 50 is sufficiently tight on the sheaves of the drive unit. The end 70 of the latching device engaging the notches 54 will prevent the end 63 of the belt 50 from exiting the buckle 60. The end 63 of the belt extending beyond the buckle 60 is simply cut off near the buckle 60.

Each of the belts described and illustrated are configured such that one belt may be coupled to another belt in the event that a single belt is not sufficiently long. One belt 10 may be coupled to another belt 10 to provide a longer length and similarly one belt 50 may be coupled to another belt 50 to provide a longer length.

The method of mounting and tightening the belt 10 to a series of pulleys is schematically illustrated in FIG. 6. The belt 10 in a loosened condition, is mounted around the pulleys 40, 42, 44. The male end 11 of the belt 10 is gripped by an operator's hand 46 and pulled back over the buckle as indicated, placing a pulling pressure against edge 48 of the buckle 16 which edge 48 as shown provides a curved biasing surface for the belt 10. The buckle is forced to slide along the belt as more length of the belt is pulled through the buckle. In the process, the shaped configuration 22 of the latching device 20 slides over the notches 14. When the operator has achieved sufficient tightness, belt end 11 is released and the notches engage the configuration 22 preventing return of the belt back through the buckle. The excess of end 11 protruded through the buckle is preferably severed and the vehicle is ready for careful driving to the next service stop where permanent repair can be affected.

Those skilled in the art will recognize that modifications and variations may be made without departing from the true spirit and scope of the invention. The invention is therefore not to be limited to the embodiments described and illustrated but is to be determined from the appended claims.

The invention claim is:

1. An emergency fan belt for a vehicle comprising:
   an elongate belt configured in cross section to fit a vehicle's fan belt pulleys, the belt having opposed ends fitted with a mated one way coupling, said coupling including a fastening mechanism that extends lengthwise along one of the ends to enable said one of the ends to be adjusted in an overlapping direction relative to the opposed end, and said coupling including a receiving buckle at the opposed end configured to have an entrance and an exit to receive and pass there through said one of the ends and further configured to have an upwardly and rearwardly curved bearing surface at the exit to allow said one of the ends as passed through the buckle to be slidably pulled in a direction back over the buckle enabling manual tightening of the belt with the belt mounted on the vehicle's pulleys.

2. An emergency fan belt as defined in claim 1 wherein the pulleys define V-shaped grooves and the belt is correspondingly V-shaped to fit the grooves.

3. An emergency fan belt as defined in claim 1 wherein said one way coupling includes flexible protrusions on the buckle angled in the overlapping direction, said fastening mechanism provided by lateral notches formed along a side of said one of the ends and which engage the protrusions of the buckle when inserted there through, said protrusions permitting sliding of said one of the ends in the overlapping direction and resisting sliding thereof through the buckle in the opposite direction.

4. An emergency fan belt as defined in claim 3 wherein the coupling is integral with elongate belt.

5. A process for providing an emergency replacement drive belt on a vehicle which comprises:
   (a) providing a drive belt having outer and inner sides and opposed ends and a cross section fitted to the pulleys of the vehicle, one end provided with notches at an inner side of the belt and the other end fitted with a buckle having outer and inner sides and one way gripping protrusions that permit the one end to be inserted into the buckle with the notches facing the gripping protrusions and being allowed to pass over the protrusions in the direction of coupling and which prevents retraction of said one end out of the buckle, and an upwardly and rearwardly curved slidable bearing surface of the buckle at the outer side of the buckle and engaging the outer side of the belt;

(b) placing the belt around the pulleys;

(c) inserting the one end through the buckle; and (d) drawing the said one end through the buckle and back over the slidable bearing surface to force the buckle further onto the belt with said one end pulled in a direction back over the buckle until achieving a tightened condition.

6. A process as defined in claim 5 wherein excess belt pulled through the buckle when is severed.

7. An emergency fan belt as defined in claim 1 wherein the buckle defines an entrance and an exit for said one of the ends, said exit defining a bearing edge configured to enhance sliding of the belt through the buckle in said reverse direction.

8. An emergency fan belt as defined in claim 7 wherein said bearing edge is upwardly and rearwardly curved to provide a sliding surface for the belt as the belt is pulled through the buckle in the reverse direction.

9. An emergency fan belt as defined in claim 3 wherein flexible protrusions on the buckle are provided by a latching device pivotally mounted in the buckle and biased toward the protrusions on the belt, said latching device engageable by a tool to pivot the device away from the protrusions on the belt and thereby uncouple said one end of the belt from the buckle.

* * * * *